(12) United States Patent
Young et al.

(10) Patent No.: US 7,461,344 B2
(45) Date of Patent: Dec. 2, 2008

(54) MIXED INITIATIVE INTERFACE CONTROL

(75) Inventors: Steven Young, Cambridge (GB);
Stephen Potter, Seattle, WA (US);
Renaud J. Lecoeuche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 10/137,796

(22) Filed: May 1, 2002

(65) Prior Publication Data

US 2002/0193907 A1 Dec. 19, 2002

(30) Foreign Application Priority Data

May 4, 2001 (EP) .................................. 01304078

(51) Int. Cl.
*G06F 3/00* (2006.01)
(52) U.S. Cl. ..................... 715/727; 715/728; 715/978; 704/275
(58) Field of Classification Search ................. 715/727, 715/728, 978; 704/275
See application file for complete search history.

(56) References Cited

U.S. PATENT DOCUMENTS

| | | | | |
|---|---|---|---|---|
| 4,305,131 A * | 12/1981 | Best | ........................... | 715/716 |
| 5,920,838 A * | 7/1999 | Mostow et al. | .............. | 704/255 |
| 5,950,167 A | 9/1999 | Yaker | ........................ | 704/275 |
| 5,999,904 A * | 12/1999 | Brown et al. | ................. | 704/272 |
| 6,246,981 B1 * | 6/2001 | Papineni et al. | ............. | 704/235 |
| 6,311,159 B1 * | 10/2001 | Van Tichelen et al. | ...... | 704/275 |
| 6,510,411 B1 * | 1/2003 | Norton et al. | ................ | 704/254 |
| 7,016,847 B1 * | 3/2006 | Tessel et al. | ................. | 704/275 |

FOREIGN PATENT DOCUMENTS

EP 0566228 10/1993

OTHER PUBLICATIONS

D. Atkins et al., "Integrated Web and Telephone Service Creation," Bell Labs Technical Journal, vol. 2, No. 1, pp. 19-35 (Dec. 21, 1997).

* cited by examiner

*Primary Examiner*—Tadesse Hailu
*Assistant Examiner*—Michael Roswell
(74) *Attorney, Agent, or Firm*—Joseph R. Kelly; Westman, Champlin & Kelly, P.A.

(57) ABSTRACT

A control system for a modular, mixed initiative, human-machine interface. The control system comprises moves, the moves defining units of interaction about a topic of information. The moves comprise at least one system move and at least one user move. Each system move is structured such that it contains information regarding pre-processing to be performed, information to develop a prompt to be issued to the user and information that enables possible user moves which can follow the system move to be listed. Each user move is structured such that it contains information relating to interpretation grammars that trigger the user move, information relating to processing to be performed based upon received and recognized data and information regarding the next move to be invoked. A corresponding method is provided.

18 Claims, 4 Drawing Sheets

MIXED INITIATIVE INTERFACE CONTROL

BACKGROUND OF THE INVENTION

This invention relates to a control system and method for modular, mixed initiative, human-machine interfaces. Examples of interfaces where this system can be used are interfaces controlled by speech recognition systems and information gathering web pages/browsers. A particular feature of the invention is to provide a mechanism for allowing the modular decomposition of mixed-initiative dialogues. A mixed initiative approach is where the user is not constrained to answer the systems direct questions but may answer in a less rigid/structured manner.

The problems associated with the current technology in this field are further detailed in the following description. Modern event-driven user interfaces provide a rich medium for interaction. The user often has a large set of available options which allows them to take the initiative in communicating with the machine. In many applications, however, it can be difficult to provide a large number of options without having complex and expensive devices to operate such applications. For example, speech-only interfaces, especially over the telephone, are highly constrained by the inability of current devices to accurately recognise more than a few keywords and phrases at a time. As a consequence, spoken dialogues for current commercial systems are typically implemented in fixed frameworks with strict control over the possible flow of system and user interactions, and requiring each question and answer to be explicitly scripted. This explicit control of dialogue allows the range of possible inputs at any point in time to be carefully controlled and thereby allows robust and useable systems to be built.

However, without extensive application-dependent handcrafting of the dialogues, the use of simple dialogue frameworks such as finite state networks or algorithms which fill the empty slots of frame structures results in applications that are either heavily system directed and which prevent the user from taking any initiative, or that are over-permissive of user initiative and are consequently subject to a greater number of recognition errors and unpredictable system behaviour (due to the greater perplexity of the input grammars). Applications built this way are typically inflexible and expensive to develop. Dialogues can be long and tedious as frequent users are frustrated by the need to navigate a long and immutable sequence of question and answers, or subject to an infuriating number of errors and false paths.

SUMMARY OF THE INVENTION

So, whilst there is a clear need to improve such systems so that they deal with users in a more acceptable and "user friendly" manner, there are various obstacles to be overcome in terms of achieving this. One significant obstacle is the development time required to produce mixed-initiative systems which allow for a wide variety of user responsive and flexible information input. At present, such mixed-initiative systems require a considerable amount of man hours to develop, and are very application specific, particularly when dealing with speech input. This makes it difficult for such systems to be employed cost effectively and on a wider scale. There is therefore a need to provide mixed-initiative systems which can be created simply and effectively and yet which still maintain the benefits of fixed framework configurations.

In addition, the possibility presented by the internet for a dialogue system to retrieve dialogue specifications from remote locations and execute them in mixed initiative contexts among other dialogues has realised the requirement for such dialogues to be modular. That is, each dialogue should be self-contained in terms of its internal operations, and it should further be able to form a composite part—a 'subdialogue'—of a broader dialogue. For example, a date dialogue can be used to obtain a departure date within an overall dialogue application which performs travel booking transactions, or it may be used to obtain a birthdate in a different dialogue application. Subdialogues should be able to integrate seamlessly with other dialogues. In order to permit mixed initiative scenarios, this means that a dialogue system must provide a framework for combining into coherent and constrained output the prompts and grammars found within the subdialogue modules, and it must also provide mechanisms for ensuring that information provided across subdialogue boundaries is properly handled by the relevant subdialogue module.

According to the present invention there is provided a control system for a modular, mixed initiative, human-machine interface, the control system comprising moves, the moves defining units of interaction about a topic of information, the moves comprising at least one system move and at least one user move, each system move being structured such that it contains information to develop a prompt to be issued to the user and information that enables possible user moves which can follow the system move to be listed, each user move being structured such that it contains information relating to interpretation grammars that trigger the user move, information relating to processing to be performed based upon received and recognised data and information regarding the next move to be invoked.

A corresponding method is also provided.

The system move may be one of a group of: tell, ask, seeking confirmation, implied confirmation (where a discrete answer is not required to confirm a belief), give help, response to silence and response to mumble.

The user move may be one of the group of: answer, accept, deny, correct, ask help, silence, mumble. These two groups are particular to the employment of the control system on a speech recognition basis. This is not an exhaustive list of moves, it simply forms what may be regarded as a core set of moves which every module must implement. It is expected that additional ones may be generated and implemented for any given application.

The moves may be combined, whether in a speech recognition system or an alternative, such as an internet browser, to form composite prompts and grammars. This may take place within a single dialogue: i.e. moves may be combined on topics within the same subdialogue, or it may take place across dialogue boundaries: i.e. moves may be combined on topics from different subdialogues. The moves may be transported through the system, or otherwise treated so that they can be processed by the relevant actions associated with their topic. Each topic may itself represent a composite structure of other topics of information.

The invention takes the approach that a dialogue (either spoken or written) can be viewed as a series of interactions between system and user, where each interactional unit is related to a piece of information (a 'topic') that is needed by the system, and more than one unit may be provided in a single dialogue turn by system or user. This approach to dialogue is useful under any control framework at a higher level. For example, it may be used where the control framework is a finite state network wherein a state in the network represents the topic of information and high-level flow follows the network. It may equally be used where the control framework is a frame slot-filling method, wherein a slot in the frame hierarchy represents the topic, and high-level flow is determined by a slot traversal strategy.

The present invention provides a control system and method for a mixed-initiative system which is simple and reliable and which, through the definition of a minimum number of moves and their resources, is modular. This has particular advantages in that a relatively unskilled designer can bring together individual components (for example time or date subdialogues) for a wide variety of differing applications without the need to introduce complex programming and analysis. This reduces considerably the time taken to set up a mixed-initiative dialogue application employing the controlled system and method of the invention. It also permits the simple 'plugging together' of separate dialogues into a common context at execution time without need to integrate, nor even view, their internal properties or operations in advance.

Furthermore, a user in prior art systems is asked a sequence of questions, in strict order predefined by the framework of states or slots, to elicit the required information and he or she will have to provide answers in the order given. If any deviation or relaxation of this ordering is required, then the dialogue designer must anticipate the variations and allow for them explicitly by adding more states and transitions, or more slots and conditions.

In a finite state framework using the interface which incorporates the invention, future states as well as the current state are activated. When asked about the current state, a user may include extra information in the answer which will be required in the future. This additional unsolicited information is decomposed into its constituent user moves and then carried forward until the appropriate action state is reached, at which point the information is processed. In a slot-filling framework using the interface which incorporates the invention, further slots in addition to the slot activated by the slot traversal algorithm are activated. When asked about the current slot, the user may provide extra information from other slots which may then be processed at the correct points in the slot framework. Under any framework, the invention also supports the use of implicit confirmation such that the user can confirm uncertain data by simply not issuing a deny or correct user move.

DETAILED DESCRIPTION OF ILLUSTRATIVE EMBODIMENTS

Figure 1:
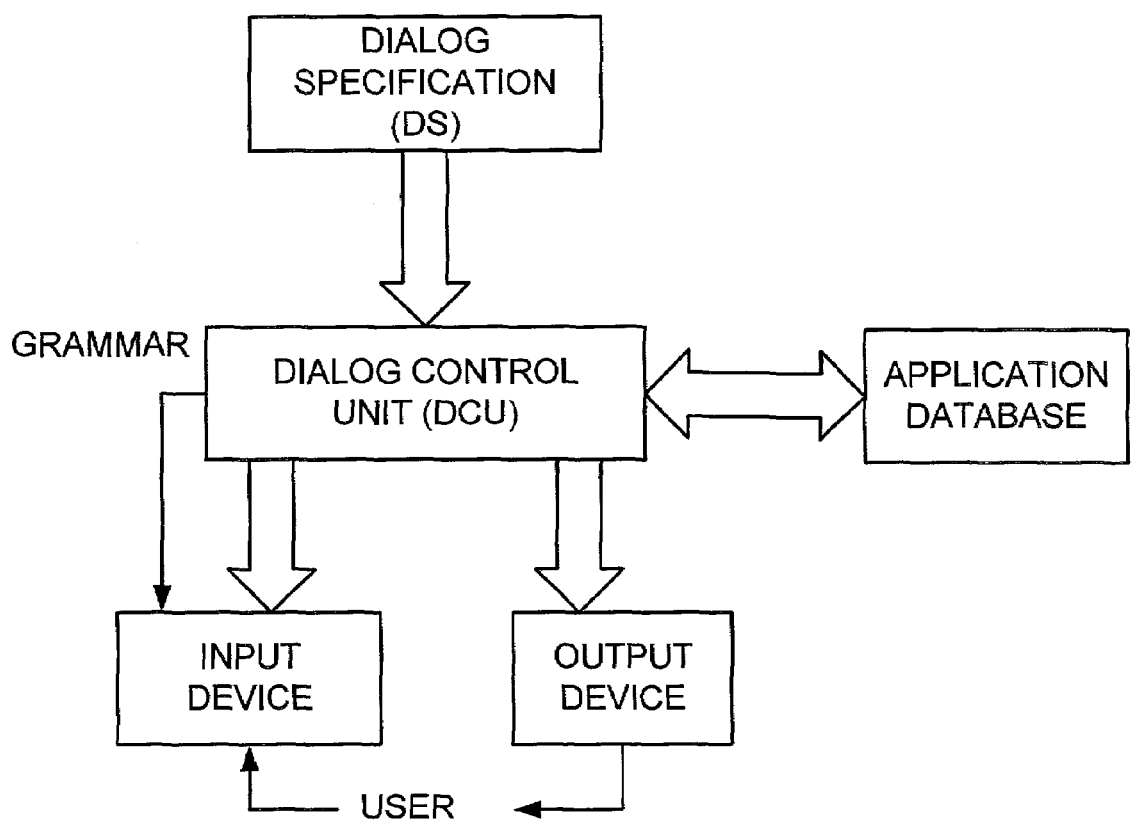
FIG. 1 is a block diagram of the human-machine interface.

FIG. 1 shows a block diagram of a human-machine interface incorporating the invention. The dialogue control unit (DCU) interprets a dialogue specification (DS), typically stored as an XML document. The DCU also interfaces to the application database which supports the required transactions (e.g. to get information, register an e-purchase, etc.). The DS will typically be structured as a network or flow chart in which each state is responsible for finding one specific value from the user, or it may be a structure of frames and slots, where slots represent the required values, and are selected for activation by the operations of a default traversal algorithm. Thus, a dialogue will typically consist of a sequence of steps and each step will consist of a sequence of questions and answers designed to find and confirm the data needed at that step. At each step, the user might request help, give a value, correct a mis-recognised value, confirm data, etc. Each of these are actions, expressed in this system by sequences of system moves and user moves.

The remainder of these illustrative descriptions use a finite state network definition of dialogue framework to clarify the invention, although as noted above, nothing intrinsic to the state network is required to support its methods.

Figure 2:
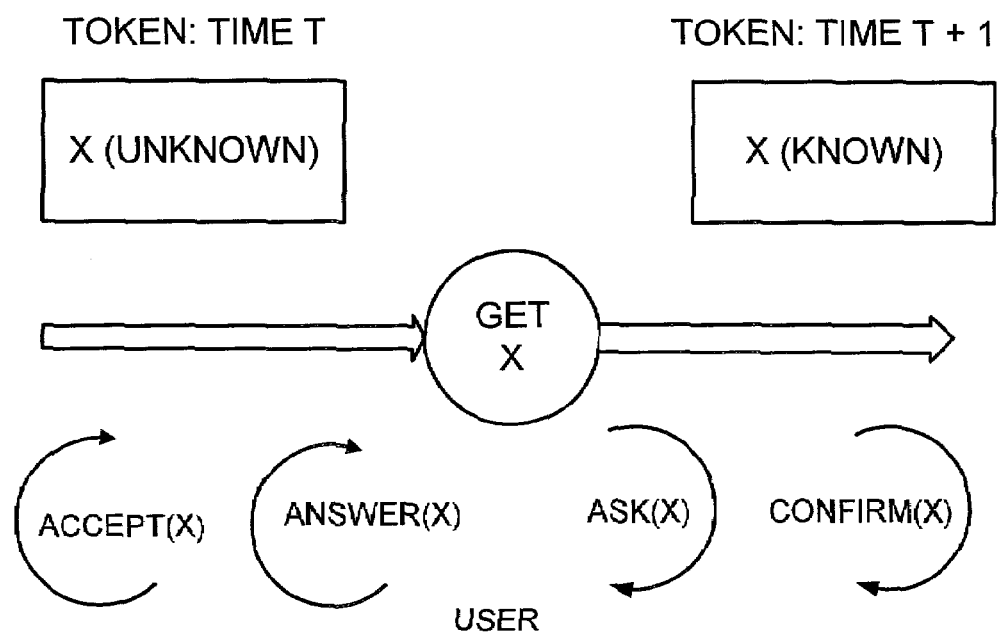
FIG. 2 shows basic execution of a state within a finite state network framework in terms of dialogue moves.

FIG. 2 illustrates this for the simple case of asking and directly confirming a question in a single state of a finite state network framework. System beliefs (i.e. the information received from the user) are stored in a token which flows through the state network. Each node of the token represents a topic of information required by the system. Each time the token passes through a state, one specific node in its internal information hierarchy is updated. Within the state, system and user moves can read and write token variables and access the application database by executing script. Each question/answer involves priming an input device with an interpretation grammar and then outputting a prompt to the output device. The purpose of priming the input device with a grammar is to constrain the range of user inputs to just those required. This is especially important when the input device is intrinsically unreliable as in the case of a speech recogniser.

Each state contains a set of system and user moves, these provide the primitive building blocks of the dialogue. A system move is responsible for generating the output prompt and activating the user moves which will prime the input data recogniser with the interpretation grammar. In a speech controlled system the interpretation grammar consists of various utterances and phrases, each of which represents an individual user move. A user move is triggered by some part of the user's input matching some part of the interpretation grammar.

Examples of system moves are ask(x), which primes the input device and generates a prompt inviting the user to provide data about the relevant topic of information (typically generated as default behaviour when entering a state for which the topic's value is unknown), and confirm(x), which is used if the system's confidence in the received data is not very high. Additional, currently defined, system moves include: tell, implied confirmation, give help, response to silence and response to mumble.

Examples of user moves are answer(x), which provides data for the relevant topic, accept(x), which sets the status of this data to be known, and deny(x), which causes the system to backtrack to a previously known state. Additional, currently defined, user moves include: correct, ask help, silence, mumble.

The example in FIG. 2 illustrates the basic operation of a state in terms of system and user moves. When the token first enters the state for topic x, the value of x is unknown. The state therefore generates an "ask(x)" system move to prime the input device and generate a prompt inviting the user to speak. In a travel booking application, for example, given a topic x corresponding to a departure city, the system move ask (DepCity) might realise a prompt such as "Where do you want to leave from?" and prime the recogniser with a grammar of city names tagged with the answer user move for departure city, as in:

<list propName="DepCity.answer">
  <phrase> Paris </phrase>
  <phrase> London </phrase>

```
<phrase> Seattle </phrase>
</list>
```

(The grammar format here and elsewhere in the text is taken from the Microsoft Speech API v5.0, as defined at http://www.microsoft.com/speech.)

If the user cooperates by supplying an answer, an "answer (x)" user move is returned to the system. This causes a value to be assigned to x and if its confidence is not very high, the state may then issue a "confirm(x)" system move. In this case the prompt might be "Did you say $x?", where $x represents the value of x, in this case $DepCity, e.g. 'Paris', and the (highly simplified) accept/deny grammar might be produced:

```
<list>
    <phrase propname="DepCity.accept"> yes </phrase>
    <phrase propname="DepCity.deny"> no </phrase>
</list>
```

If the user confirms the value with a 'yes', an "accept(x)" user move is triggered. This sets the status of x to be known (or grounded) and the token leaves the state.

The mixed initiative interface that is supported by the invention allows multiple states to be activated at one time. Not only is the current state considered but extra data may be provided which will be required later. Such data is transported forward until the appropriate state in the network is reached when it is automatically processed. In addition, this facility allows implicit confirmation to be achieved to further enhance the efficiency of the system. This will further reduce the frustration of an experienced user, as fewer explicit confirmation statements will have to be presented.

The interface allows frequent users to "learn" the dialogue and hence streamline their response to it, this reduces time spent on the interaction. If the dialogue has been used before then it is simply a matter of anticipating the questions. However, if insufficient data is received or the utterances cannot be interpreted the user will be prompted for appropriate answers. The level of sophistication is dynamically altered to suit the user by changing the size of the "focus space". The "focus space" determines the range of active states (or slots). If mistakes are made or the level of confidence in the answers is particularly low the base line model can be reinstated and a structured set of questions will be posed by reducing the focus space to contain only the current state (or slot).

Figure 3:
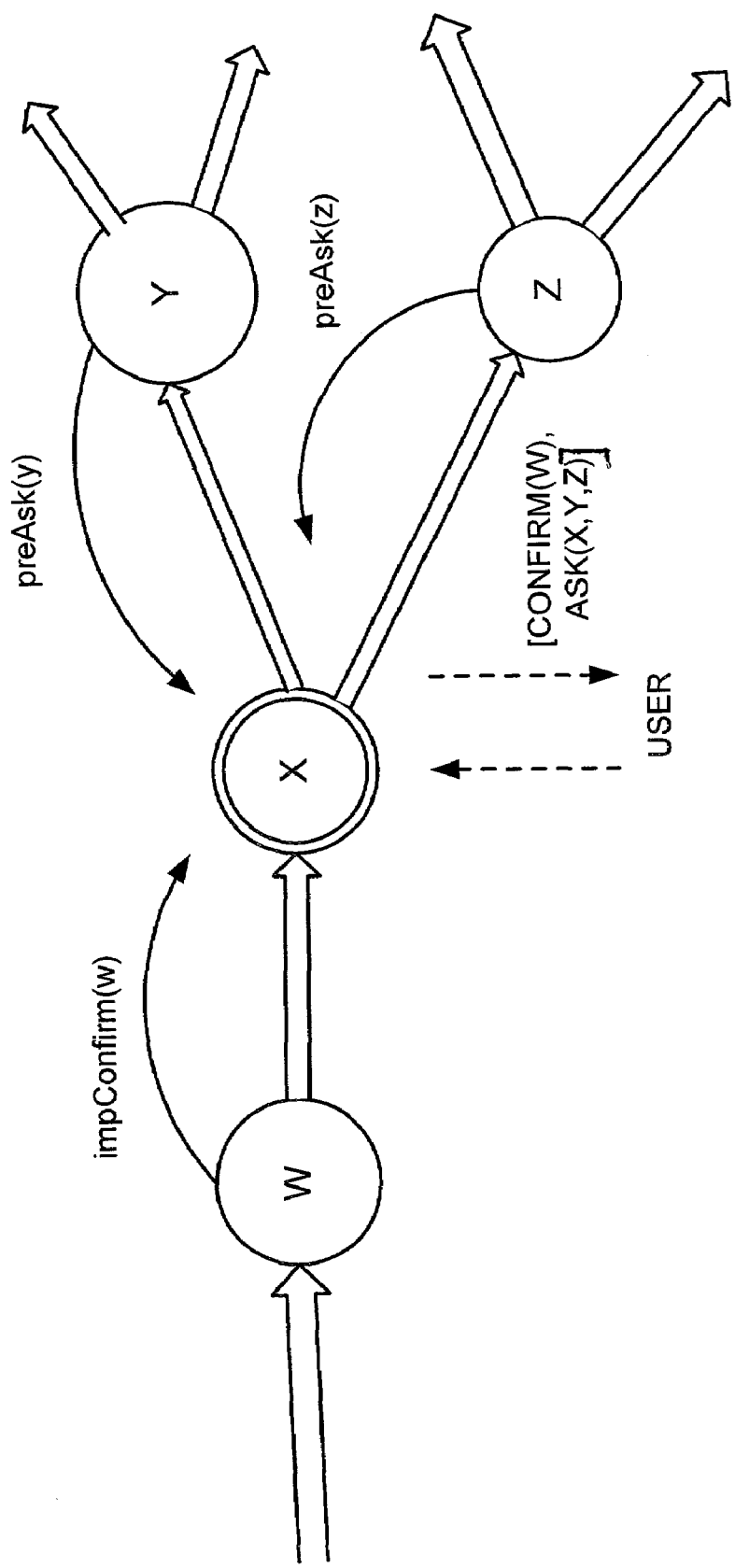
FIG. 3 shows a combination of moves to support mixed initiative in a finite state network framework.

FIG. 3 illustrates a typical situation. The current state is x. The preceding state w gathered a value for itself but did not explicitly confirm it. Instead it generated a deferred "impConfirm" move which gets carried forward with the token waiting for an appropriate system move to attach itself to, typically an "ask" move. Before generating its own "ask" move, state x imports "ask" moves from succeeding states. The grammars associated with these pre-fetched ask moves will be incorporated into the current ask grammar (although the pre-fetched ask prompts are typically not output). Similarly, the yes/no and correction grammars associated with the "impConfirm" move will be incorporated. The net effect is that the user will be given a prompt composed of the both the ask and the impConfirm, along the lines of : "You want w. What is x?". A more coherently authored example, given a departure city topic w with value 'Paris' and a date for topic x, might be: "You want to leave Paris on what date?". The constructed interpretation grammar will allow the user to respond with a simple deny such as "no", a deny and correction such as "No, w is ... not ... " or with a direct answer such as "x is ... ", or with information that might be used later as in "x is ... and y is ... ". When a deny move is triggered, the token backtracks carrying any correction move with it. When future moves are triggered, they get carried forward with the token until they reach their own state, at which time they are processed. Note that each token node is read-only to all states except the state to which it is linked. This enables a strict, full history to be maintained to allow the facility of back-tracking to be implemented.

All moves are specified using XML tags and, from the authoring perspective, moves provide a highly convenient level at which interfaces can be customised. Firstly for simple basic authoring, the default state behaviour can be used. In this case, all that the author has to specify are the actual grammars and prompts. At the next level, a move itself can be customised via embedded scripting and by manipulating the next action and follow user move lists. Finally, the author can define new moves and link them into the state processing in order to implement new behaviours.

A key feature of moves is that they can be combined to form composite prompts and grammars. This was illustrated in FIG. 3 where, with mixed initiative enabled, several system moves could be combined to generate a composite prompt. In the example, the basic "ask(x)" move is augmented by an implicit confirm move for w and pre-ask system moves for y and z.

Figure 4:
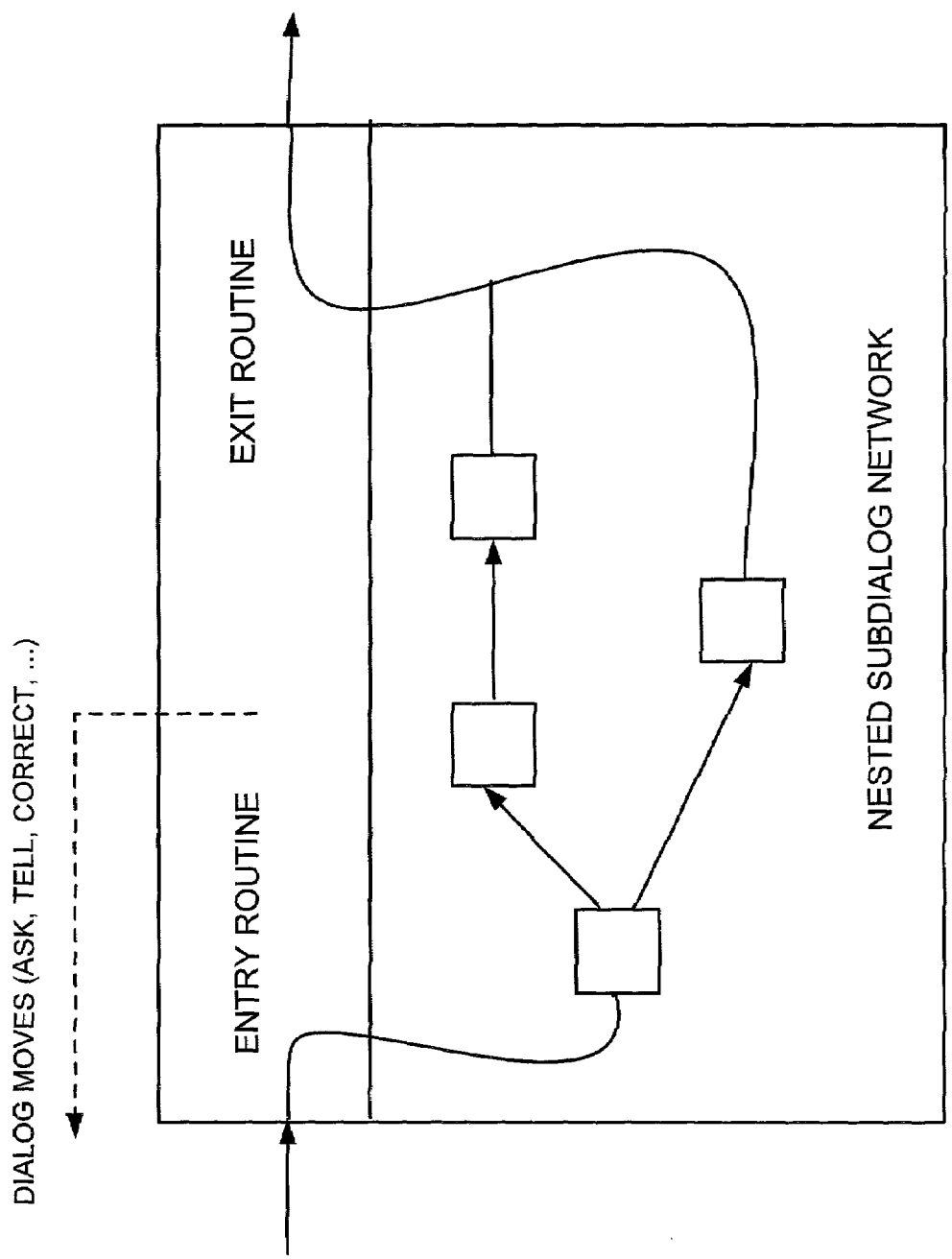
FIG. 4 illustrates the use of moves to define module interfaces to a dialogue defined in a finite state network framework.

Another key feature of moves is that they provide a powerful mechanism for specifying dialogue module interfaces. FIG. 4 shows a sub-dialogue represented by a sub-network. In normal operation, control (represented here by the token) passes into the sub-network, the sub-dialogue executes and control passes to the next sub-network as in any procedural programming paradigm. However, if the functionality of this sub-network is required in some other sub-dialogue, then the needed functions can be exported as moves.

Typically, a module will export system moves and the set of user moves that are legal followers. Hence when a subdialogue module is activated (by coming into the "focus space", for example), the grammars associated with the subdialogue's usermoves are activated in the ways described for a simple state in FIG. 3. This move interface is a powerful and efficient aid to dialogue modularity. It permits the module to participate fully in mixed initiative scenarios, and it also means the entire model does not have to be loaded until its internal operations are known to be required. If an exported user move is triggered by the user providing input which matches one of those grammars, the resulting semantic tree structure is carried into the module. As it passes through the module interface, it is decomposed into its constituent parts and carried through the sub-network states. Any user moves which remain unprocessed by the sub-network can be recomposed at the output and propagated forwards. Thus the use of moves allows a module to participate in a mixed initiative operation in a way that is transparent to the module itself.

An example system is written in C++ which uses the Microsoft XML parser (MSXML), the Microsoft JScript interpreter and the Microsoft Speech API. Each dialogue specification consists of XML pages, with certain elements containing embedded code in JScript. Moves are described within the pages under an XML formalism defined for this purpose, and grammars are defined in the Microsoft Speech API v5.0 format. The dialogue specification is first parsed and converted to an internal tree representation, the tree is then scanned and a representation of the finite state machine is then built and subsequently executed.

Although the present invention has been described with reference to particular embodiments, workers skilled in the art will recognize that changes may be made in form and detail without departing from the spirit and scope of the invention.

What is claimed is:

1. A control system for a mixed initiative, human-machine interface, the control system comprising:

a dialog control unit configured to implement moves, the moves defining units of interaction on a topic of information, the moves comprising at least one system move and at least one user move, each system move generating a prompt to be issued to a user and information that activates a subset of the user moves as possible user moves which can follow the system move, each possible user move activating one or more corresponding interpretation grammars that, when matched by a user input, trigger the corresponding user move, wherein the dialog control unit combines moves such that the system moves generate composite prompts and the user moves activate a plurality of interpretation grammars.

2. A control system as defined in claim 1, wherein each system move is one of the group: tell, ask, seeking confirmation, implied confirmation, give help, response to silence and response to mumble.

3. A control system as defined in claim 1 wherein each user move is one of the group: answer, accept, deny, correct, ask help, silence, mumble.

4. A control system as defined in claim 1 wherein the moves are used to define the interface to a dialogue.

5. A control system as defined in claim 1 wherein the dialog control unit transports the moves through the system such that information input in response to a previous prompt can be processed by subsequent actions associated with the topic of information.

6. A control system as defined in claim 1 wherein the dialog control unit processes the topic of information as a composite structure of further topics.

7. A control system as defined in claim 1 wherein one of the moves comprises other moves.

8. A control system as defined in claim 1 wherein each system move also contains information regarding pre-processing to be performed.

9. A control system as defined in claim 1 wherein each system move also contains information regarding post-processing to be performed.

10. A control method for modular, mixed initiative, human-machine interface, the control method comprising the steps of:

defining moves in a dialog control unit, the moves defining units of interaction about a topic of information, the moves comprising at least one system move and at least one user move, each system move being structured such that, when it is implemented by the dialog control unit, it generates a prompt to be issued to a user and it enables a plurality of possible user moves which can follow the system move, each possible user move, when enabled, constraining recognizable user inputs by activating only corresponding interpretation grammars that, when matched by a user input, trigger the corresponding user move, the user move also identifying information relating to processing to be performed based upon a received and recognized user input and information regarding a next move to be invoked; and controlling the interface with the dialog control unit to obtain information in a mixed initiative manner from a user, wherein the moves are combined to form composite prompts and grammars.

11. A method as defined in claim 10, wherein each system move is defined as one of a group: tell, ask, seeking confirmation, implied confirmation, give help, response to silence and response to mumble.

12. A method as defined in claim 10 wherein each user move is defined as one of the group: answer, accept, deny, correct, ask help, silence, mumble.

13. A method as defined in claim 10 wherein the moves are used to define the interface to a dialogue.

14. A method as defined in claim 10 further comprising the step of:

transporting the moves through the system such that a user input provided during a previous move can be processed by relevant actions associated with the topic of information in a subsequent move.

15. The method as defined in claim 10 wherein the topic of information is a composite structure of further topics.

16. A method as defined in claim 10 wherein the move is composed of other moves.

17. A method as defined in claim 10 wherein each system move also includes information regarding pre-processing to be performed.

18. A method as defined in claim 10 wherein each system move also includes information regarding post-processing to be performed.

* * * * *